United States Patent

Villari

[15] 3,683,894

[45] Aug. 15, 1972

[54] URINE METER AND DRAINAGE RECEPTACLES

[72] Inventor: Frank K. Villari, Oak Park, Ill.

[73] Assignee: The Kendall Company, Boston, Mass.

[22] Filed: Sept. 21, 1970

[21] Appl. No.: 74,037

[52] U.S. Cl. .................................128/2 F, 128/275
[51] Int. Cl. ..............................................A61b 5/00
[58] Field of Search.....73/425.2; 128/275, 2 F, DIG. 24, 128/295

[56] References Cited

UNITED STATES PATENTS

| | | | |
|---|---|---|---|
| R26,964 | 10/1970 | Coanda | 128/295 X |
| 3,564,620 | 2/1971 | Clark | 128/295 X |
| 2,800,269 | 7/1957 | Smith | 128/DIG. 24 |
| 3,537,455 | 11/1970 | Skyles | 128/275 |
| 3,534,738 | 10/1970 | Huck | 128/275 |
| 3,478,743 | 11/1969 | Ericson | 128/275 |

OTHER PUBLICATIONS

Publication: " Uri-meter" in Surgical Equipment & Supplies MSR Apr.- May 1971. Page 15. (Davol Inc).

*Primary Examiner*—Louis R. Prince
*Assistant Examiner*—Daniel M. Yasich
*Attorney*—Robert D. Chodera

[57] ABSTRACT

A combination urine meter and drainage receptacle wherein the urine metering element and the drainage receptacle element may be separately drainable of liquid contained therein. The interiors of the metering element and the drainage receptacle element communicate with each other by a conduit through which liquid may pass from the metering element out of an exit portal therein into the drainage receptacle through a receiving portal therein. The combination includes means to support the urine metering element and maintain the urine metering element and drainage element in relatively stable positions relative to each other such that the receiving portal in the receptacle element is normally above or at the same level as the exit portal in the metering element. Fluid in the metering element of this combination can be emptied into the receptacle element simply by positioning said elements such that the metering element exit portal is properly located above the receiving portal of the receptacle element.

13 Claims, 6 Drawing Figures

PATENTED AUG 15 1972

URINE METER AND DRAINAGE RECEPTACLES

BACKGROUND OF THE INVENTION

This invention relates to a combined urine meter and drainage receptacle.

Proper treatment of medical patients requires in many cases that urine and other fluids be drained from the patients' bodies. Such fluids are commonly drained from a patient's body through a tubular device, such as a catheter, into a connecting conduit leading into a container. Samples may be taken from the container and subjected to analysis, or the fluid in the container may be merely disposed of. The entire drainage procedure should be accomplished aseptically to eliminate the possibility of infection from bacteria entering the patient's body through the drainage system.

In many instances, usually following surgical procedures, maintenance of fluid balance in a patient's body is critical to the success of the patient's recovery or care. In such cases it is normally imperative to monitor the rate at which fluid passes from the patient's body over a given time period or to measure the total amount of fluid that has passed from the patient over a period of time.

SUMMARY OF THE INVENTION

It is an object of this invention to provide a combined urine meter and drainage receptacle into which urine may be aseptically drained and collected after passing from a patient's body and which includes a means of measuring both the rate of urine flow from the patient's body over a given time period and the total amount of urine passed from the patient during a perhaps longer period of time.

It is a further object of this invention to provide a combination urine meter and drainage receptacle in which the urine meter and the drainage receptacle are communicating elements of the combination which may be separately drained, and which may be vented to the atmosphere by bacteriological filters.

It is also an object of this invention to provide a combination urine meter and drainage receptacle wherein any excess amount of liquid entering the metering element will overflow into the receptacle.

Another object of this invention is to provide a combination urine meter and drainage receptacle wherein all or a portion of the fluid in the metering element may be drained into the receptacle by raising the metering element to a position above the receptacle.

Yet another object of this invention is to provide a combination urine meter and drainage receptacle which may be conveniently positioned during use so as not to interfere with activity in the vicinity of a patient.

This invention includes as one element of the combination a urine metering element scaled to indicate the volume of liquid therein. The metering element has an inlet opening through which urine is brought into the interior of the urine metering element from a patient's body through a conduit. The metering element may include at or near its lowest part a closable sampling port through which urine samples may be drained from the urine metering element from time to time. The metering element includes an exit portal through which the interior of the urine metering element communicates with the interior of the drainage receptacle element of this combination. A bacterial filter and venting means is provided which permits air to pass into and out of the metering element but preferably will not permit the passage of urine therethrough.

The drainage receptacle element of this invention comprises a container having a receiving portal through which the interior of the drainage receptacle communicates with the interior of the metering element and through which urine from the metering element may pass into the receptacle. The drainage receptacle may also include a bacteriological filter and venting means through which air may enter and leave the container but through which, preferably, urine may not pass. The drainage receptacle may also include a closable drainage port through which urine may be drained from the container. If desired, the receptacle may also include scale markings to indicate the volume of urine contained therein.

The interior of the drainage receptacle element communicates with the interior of the urine metering element by a conduit through which fluid passes out of the exit portal in the urine metering element and into the receptacle element through its receiving portal. The conduit comprises a hollow tube connected by fluid-tight connections to both the urine metering element and the receptacle element. The conduit must be capable of transmitting fluid from the interior of the metering element to the interior of the receptacle element without leakage of fluid from the combination, and should not prevent movement of the urine metering element and receptacle element from substantially side-by-side positions to positions wherein the exit portal in the metering element is above the receiving portal in the receptacle element, so that fluid can be drained from the metering element into the receptacle. Hollow thermoplastic or rubber tubing may be utilized as a conduit for this combination.

This invention includes means to support the metering element whereby the drainage receptacle and metering elements may be maintained in relatively stable predetermined positions relative to each other, usually side-by-side, and preferably with the receiving portal in the receptacle element positioned above or at least not lower than the exit portal of the urine metering element, so that the urine metering element will at least partially fill with liquid before liquid is transmitted through the conduit from the metering element into the receptacle. By properly positioning the exit portal and receiving portal, any excess liquid received into the metering element will cause a corresponding amount to overflow into the receptacle, thus preventing overfilling of the metering element and avoiding the undesirable possibility of liquid backing up out of the metering element. Fluid in the metering element may be emptied into the receptacle element through the aforesaid conduit simply by positioning the elements of this combination such that the exit portal of the metering element is above the receiving portal of the receptacle so that fluid will naturally flow from the metering element into the receptacle.

The metering and receptacle elements of this invention may be constructed of any of a variety of materials, such as thermoplastic materials, so long as they are impermeable to fluid. The metering element and the receptacle may be either flexible or rigid. They may be constructed of the same material or different materials, and both may be rigid or flexible, or one may be rigid and the other flexible, it being only necessary that the metering element be not deformable by the presence of fluid therein to the extent that a reasonably accurate measurement of the volume of fluid contained therein would not be indicated by a scale on the metering element.

BRIEF DESCRIPTION OF THE DRAWINGS

The objects and exact nature of this invention may be better understood by consideration of the following description of preferred embodiments detailed in reference to the accompanying drawings, in which.

DESCRIPTION OF THE PREFERRED EMBODIMENTS

Figure 1:
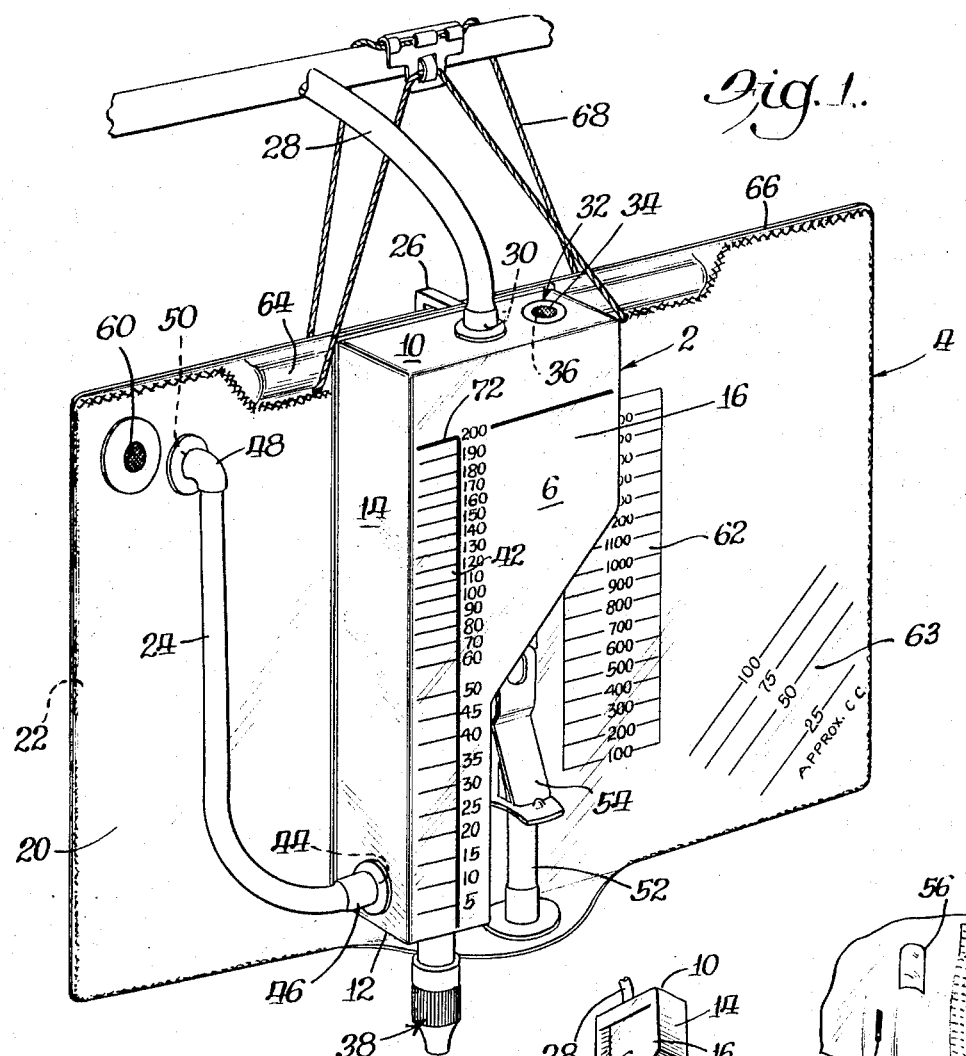
FIG. 1 is a perspective view of a preferred embodiment of the combination urine meter and drainage receptacle of this invention.

Referring to the drawings, FIGS. 1-6 illustrate a preferred embodiment of this combination urine meter and drainage receptacle having a urine metering element 2 and a drainage receptacle element 4. The metering element 2 comprises a front wall 6, a back wall 8, a top 10, a bottom 12, and side walls 14 defining a rigid container with an upper section 16 and a lower section 18 of smaller internal volume per unit of height than the upper section. The receptacle element 4 comprises a front sheet 20 and a back sheet 22 of flexible fluid impervious material. The front sheet 20 and back sheet 22 are sealed along their marginal edge portion to form a flexible bag container. This combination urine meter and drainage receptacle also includes a fluid impervious connecting conduit 24 through which the interior of the metering element 2 communicates with the interior of the receptacle element 4, and a means 26 for maintaining the metering element 2 and the receptacle 4 in somewhat stable positions relative to each other.

A hollow tube 28 opens into the interior of the metering element 2 through an inlet opening 30. The tube 28 serves as a conduit through which fluid, such as urine, may pass into the metering element 2 from a body, such fluid perhaps originally being removed from the body through a catheter or other similar device.

The metering element has a venting means which vents the interior of the metering element to the outside air through a bacteriological filter through which, preferably, urine may not pass from the interior of the metering element. The venting means 32 shown in the drawings comprises a hydrophobic, bacteriological filtering material 34 sealingly covering a vent opening 36 in the top 10 of the metering element so that urine may not escape from the metering element through or around the filtering material 34. The venting means filters bacteria from the air entering the metering element, thereby avoiding contamination of urine which might be needed for sampling and analysis and preventing bacteria from migrating from the interior of the metering element through the tubing into the body being drained and causing retrograde infection therein. Several suitable materials are available to serve as bacteriological filters on this invention. They may consist of a framework of woven or other mesh-like material, such as cotton or fiberglass, joined to a very fine-pored film-like material or may be made from non-woven material coated or treated to make them resistant to fluids. A material found particularly suitable for use as the filtering material is a woven Teflon fabric coated with fluorocarbon, which is sold by the Pallflex Corporation of the Pall Trinity Company, Putnam, Connecticut.

At the bottom of the urine metering element 2 is a closable sampling port 38, which may be opened to drain fluid from the interior of the metering element. The sampling port 38 is sealed to the bottom 12 of the metering element around release opening 40 such that fluid cannot escape from the interior of the metering element when the sampling port 38 is closed but will drain out of the metering element when the sampling port 38 is opened. Any one of a number of well-known, commercially available openable and closable valves, such as push-pull valves or "faucet-type" valves, is suitable for use as this drainage port. Sampling port 38, shown in the drawings, is, a commercially available push-pull valve which is opened by pulling down on its lower portion.

In the embodiments shown a scale 42 is located on the front wall 6 of the urine metering element 2. The scale 42 serves as an indication of the volume of liquid in the metering element. Since the lower section 18 of the metering element, as shown, is of smaller volume than the upper section 16, the scale markings for a given unit of volume measurement will be spaced further apart on the lower section than on the upper section, thereby facilitating the measurement of smaller volumes of urine in the lower section. Also, the scale gradations are calibrated to account for any liquid which passes from the interior of the metering element 2 into tube 24. At least one of the walls of the metering element 2 is light transmittable to an extent that permits a volume reading on the scale. As a preferred embodiment, at least a portion of the walls of the metering element 2 should be transparent so that urine coloration changes may be readily apparent upon visual examination.

The metering element 2 has an exit portal 44 at a lower point in one wall. The exit portal 44 opens into conduit 24, which comprises a hollow, flexible tube of fluid impervious material. The conduit 24 is connected at one end 46 to the metering element around the exit portal 44 by a fluid-tight connection. The second end 48 of conduit 24 extends to the receptacle element 4 where it opens into the interior of the receptacle element through a receiving portal 50 in the receptacle element. The conduit 24 is connected at its second end 48 to the receptacle element by a fluid-tight connection around the receiving portal 50. Thus, the conduit 24 provides a passageway through which the interior of the metering element 2 communicates with the interior of the receptacle element 4.

Figure 6:
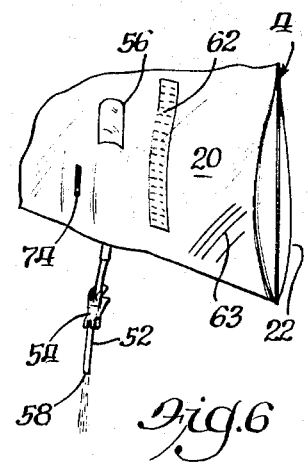
FIG. 6 shows the receptacle drainage port of the urine meter and drainage receptacle of FIG. 2 positioned for drainage of liquid therefrom.
Figure 3:
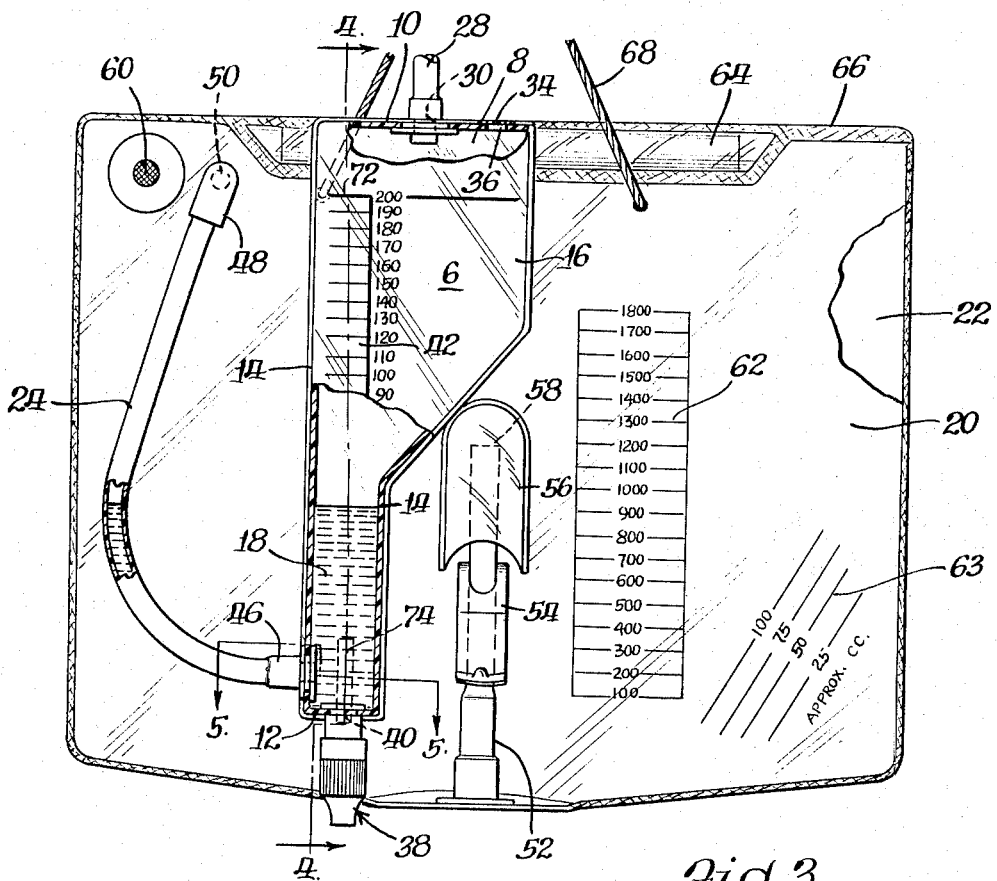
FIG. 3 is a front view of the urine meter and drainage receptacle of FIG. 2, with a partially broken away section showing fluid in the metering element.

The receptacle element 4 also has a closable drainage port 52 near its bottom edge through which liquid may be drained from the receptacle element. It is convenient for purposes of balance to locate drainage port 52 at the approximate middle of the bottom edge. It is preferred that the bottom portion be shaped so that liquid in the receptacle interior will naturally flow toward the drainage port. As shown in FIGS. 1 and 3, the drainage port 52 is a short, hollow tube closable by a removable clamping means 54. A side pocket 56 is provided on the front sheet 20 of the receptacle for storage of drainage port 52. Storing the drainage port tube 52 with its drainage opening 58 directed upward helps prevent unwanted drippage from the drainage port. To drain urine from the receptacle, the drainage port 52 is removed from the side pocket 56 and the clamp 54 is opened, as shown in FIG. 6.

The receptacle element shown also includes a bacteriological venting means 60 on its front panel. The venting means 60 permits passage of filtered air into and out of the receptacle. In its preferred form, however, venting means 60 does not permit the passage of urine therethrough. The venting means 60 may be constructed in a similar fashion as the venting means 32 of the metering element 2.

The receptacle element shown also has scale markings 62,63 on its front panel 20 adapted to permit measurement of the volume of fluid contained therein.

A support rod 64 is positioned along the top edge 66 of the receptacle to stabilize and provide a means whereby the receptacle may be hung from a bar, bed rail, nail, or the like, by a hanging means, such as cord 68. The rod may be constructed of stiff cardboard, metal, plastic, or other material which is strong enough to support the weight of the combined urine meter and drainage receptacle filled with urine. The rod may be attached to the receptacle or housed in a compartment formed by seals around the rod between the front sheet 20 and back sheet 22, as shown in FIGS. 3 and 4 of the drawings.

Figure 4:
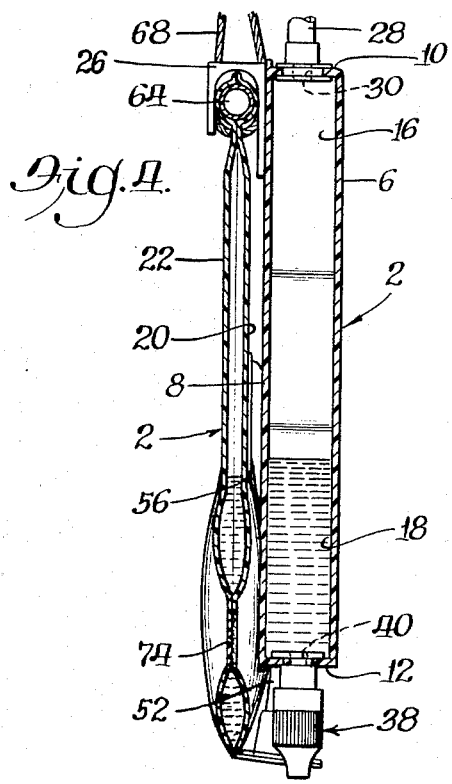
FIG. 4 is a sectional view taken along line 4—4 of FIG. 3.

The means 26 shown in FIGS. 1 and 4 for maintaining the metering element 2 and the receptacle element 4 in somewhat stable predetermined positions relative to each other comprises a support device attached to the back wall 8 of the metering element. It includes a hook portion adapted to be removably fastened over support rod 64 to maintain the metering element 2 in a hanging relationship therewith, with the metering element and receptacle element held in predetermined positions relative to each other.

When the metering element 2 and receptacle element 4 are in said predetermined positions relative to each other, as shown in FIGS. 1 and 3, the receiving portal 50 of the receptacle is above the exit portal 44 of the metering element. Thus, the metering element will at least partially fill up with liquid before liquid will be transmitted through conduit 24 into the receptacle. Preferably, when the elements are in said predetermined positions relative to each other, the top end 72 of the scale 42 on the metering element 2 is approximately at the level of the lowest edge of the receiving portal 50 of the receptacle. Then, after the liquid in the metering element has reached the top of the scale, any additional amount of liquid introduced into the metering element will simply cause a corresponding amount to overflow through conduit 24 into the receptacle.

The body of the metering element, can be manufactured from any of a variety of materials which are impervious to water. Examples of materials suitable for this purpose are polyvinyl chloride, cellulose propionate, cellulose acetate, cellulose butyrates and styrene. The metering element may be formed by any of a variety of methods well known in the art, such as injection molding, blow molding, rotational molding, or vacuum forming.

The receptacle element may comprise a bag made by sealing together front and back sheets of material along their outer edges. Materials suitable for construction of the front and back sheets forming the receptacle include flexible films of polyvinyl chloride, polyethylene, polypropylene, and the like.

The seals between the various elements and parts of this invention are liquid-tight to prevent unwanted leakage from the interior of the combination urine meter and drainage receptacle.

Figure 5:
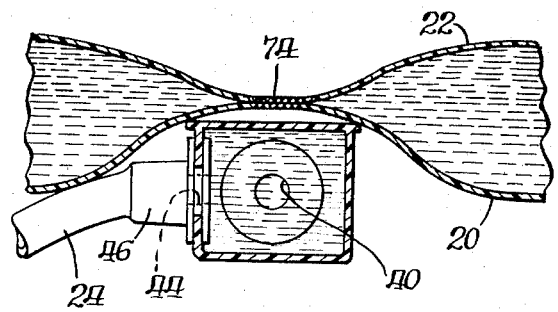
FIG. 5 is a sectional view taken along line 5—5 of FIG. 3.

Receptacle element 4 also includes a sealed zone 74 between its front sheet 20 and back sheet 22. The metering element may be hung by means 26 from the support rod 64 so that the back wall 8 of the metering element rests adjacent to seal zone 74. Then, as illustrated in FIGS. 3, 4, and 5, when the receptacle contains liquid in its lower portion, seal zone 74 creates an indentation in the expanded receptacle wherein the lower part of the metering element may rest, thereby reducing the likelihood that the metering element will be thrust outwardly by the expanded receptacle walls. Otherwise, the lower portion of the metering element might be pushed outwardly by the front wall of the expanded receptacle to interfere with activity around the combination urine meter and drainage receptacle and perhaps prevent an accurate reading of the volume of liquid in the metering element from being taken on the scale of the metering element. The seal zone 74 is located intermediate the marginal edges of the receptacle so as not to form separate, sealed compartments therein. Instead of a line seal, as shown in the drawings, to form seal zone 74 to accommodate the lower part of the meter as previously explained, the zone may be formed by sealing portions of the front and back sheets 20 and 22 together in a configuration generally corresponding to the outline of the meter to form a depression or indentation in the receptacle when containing liquid into which the meter may nest. Additional means for limiting the protrusion of the metering element from the expanded receptacle include a pocket structure, strap, or the like, which extends around the metering element and secures it close to the front wall of the receptacle.

Figure 2:
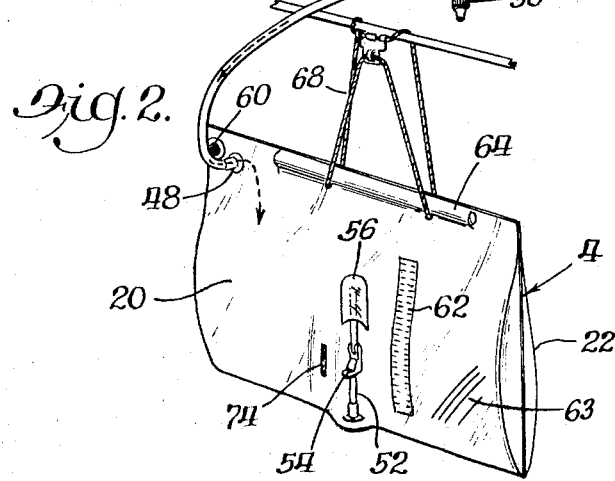
FIG. 2 shows the embodiment of FIG. 1 with the elements of the combination positioned appropriately for the drainage of fluid from the urine metering element to the receptacle, the receptacle being partially filled with fluid draining from the metering element.

FIG. 2 of the drawings shows an embodiment of the invention partially filled with liquid and with its elements positioned to facilitate transfer of liquid from the metering element 2 into the receptacle element 4. The metering element is simply raised high enough to place its exit portal 44 above the receiving portal 50 of the receptacle element, as shown, so that liquid will naturally flow through the connecting conduit 24 from the metering element into the receptacle.

Thus, with this invention, it is very easy to drain a quantity of urine into the metering element and measure its flow rate, raise the metering element to empty that urine into the receptacle, and return the elements to their original positions so that another quantity of urine can be drained into the metering element and measured.

Although this invention is mainly concerned with the provision of a meter and drainage receptacle for urine, it should be understood that it can also be utilized in the measurement and storage of other liquids.

Various modifications from the above-described embodiments will be obvious to a person of skill in the art of this invention. This invention is intended to include all such variations, limited only by the scope of the following claims.

I claim:

1. A combination urine meter and drainage receptacle comprising:
    a liquid meter defined by a first container having at least one volume-calibrated chamber, said meter having an inlet opening through which liquid may be introduced to said chamber and an exit portal spaced from and located below said opening;
    a receptacle defined by a second container having a receiving portal located in a position above the bottom of said container and near the top thereof;
    means for detachably attaching said meter and receptacle together in a position such that the receiving portal of the receptacle is located above the exit portal of the meter and below the inlet opening thereof; and
    a conduit extending from said exit portal to said receiving portal to provide a path of liquid flow from the interior of said meter to the interior of said receptacle whereby, when said meter is filled to the level corresponding to the level of said receiving portal when the meter and receptacle are in said position, additional liquid entering said meter causes liquid to flow from said meter into said receptacle through said portals and conduit.

2. The combination urine meter and drainage receptacle of claim 1 wherein said meter includes a closable sampling port which may be opened to permit liquid to be drained out of the combination from the interior of said meter.

3. The combination of claim 2 wherein said receptacle includes a closable drainage port which may be opened to permit liquid to be drained out of the combination from the interior of said receptacle.

4. The combination urine meter and drainage receptacle of claim 1 wherein said first container defining the meter includes a vent opening through one of its walls and a bacterial filter connected to said vent, said filter being pervious to air and positioned to filter air entering said meter through said vent.

5. The combination of claim 4 wherein said filter is impervious to body fluids and is positioned to prevent body fluids from leaving said meter through said vent.

6. The combination of claim 4 wherein said vent is located in the upper portion of said meter.

7. The combination of claim 4 wherein said second container defining the receptacle also includes a vent opening through one of its walls and a bacterial filter connected to said vent, said filter being pervious to air and positioned to filter air entering said receptacle through said vent.

8. The combination of claim 1 wherein said first container defining said meter comprises an upper section and a lower section, said lower section being of smaller volume per unit of height than said upper section, and being calibrated to facilitate more accurate measurement of small changes in volume of liquid in said lower section than in said upper section.

9. The combination of claim 8 wherein:
    said receptacle comprises a front and a back sheet of flexible, fluid impervious material, said front and back sheets being sealed together along their marginal edge portions to form said second container, said front and back sheets also being sealed together along portions thereof intermediate the marginal edges to form an indentation in the receptacle when containing liquid; and wherein
    said meter is positioned adjacent the receptacle to overlie the indentation when the receptacle contains liquid.

10. A combination urine meter and drainage receptacle comprising:
    a urine meter defined by a first container having a front wall, a back wall, a top, a bottom, and side walls of rigid, fluid-impervious material, said first container having an upper section and a lower section of smaller volume per unit of height than said upper section, said front wall having thereon a scale to indicate the volume of liquid contained in said meter, said first container also having an inlet opening in said top through which fluid may be introduced into said meter, a closable sampling port at said bottom which may be opened to drain liquid from the interior of said meter, a vent opening into the meter through said top with a bacteriological filter connected to said vent, said filter being pervious to air and impervious to body fluids and positioned to filter air entering said meter through said vent, and an exit portal located in a portion of a side wall along said lower section;
    a receptacle comprising front and back panels of flexible, fluid-impervious sheet material sealed together along their marginal edge portions to define a bag-like second container having a receiving portal in the front panel, a vent opening into the receptacle through said front panel with a bacteriological filter connected to said vent, said filter being pervious to air and impervious to body fluids and positioned to filter air entering said receptacle through said vent and prevent body fluids from leaving the receptacle through said vent, a scale on said front panel adapted to indicate the volume of liquid contained in said receptacle, a closable drainage port located near the bottom edge of said second container through which liquid may be drained from said combination;
    a hollow conduit extending from said exit portal, where it is connected to said meter by a fluid-tight connection, to said receiving portal, where it is connected to said receptacle by another fluid-tight connection, whereby the interior of said meter communicates through said exit portal with the interior of said receptacle through said receiving portal by means of said conduit, so that fluid may pass from the interior of the meter into the interior of said receptacle through said conduit; and means for maintaining said meter and said receptacle in predetermined positions relative to each other such that, when so maintained, said receiving portal is above said exit portal.

11. The combination of claim 10 wherein said closable drainage port located near the bottom edge of said second container comprises a hollow tube opening out of said receptacle and being closable by a removable clamping means.

12. The combination of claim 11 including a side pocket on the front panel of said receptacle wherein said hollow tube may be stored with its opening directed upward.

13. The combination of claim 10 including means attached to said receptacle for hanging said combination urine meter and drainage receptacle from a supporting structure.

* * * * *